United States Patent
Uminski et al.

(10) Patent No.: US 12,143,316 B2
(45) Date of Patent: Nov. 12, 2024

(54) SOFTWARE-CONTROLLED ACTIVE-BACKUP MODE OF LINK AGGREGATION FOR RDMA AND VIRTUAL FUNCTIONS

(71) Applicant: Intel Corporation, Santa Clara, CA (US)

(72) Inventors: Piotr Uminski, Gdynia (PL); Anjali Singhai Jain, Portland, OR (US); Eliel Louzoun, Jerusalem (IL); Robert O. Sharp, Austin, TX (US); Vivek Kashyap, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 878 days.

(21) Appl. No.: 17/026,651

(22) Filed: Sep. 21, 2020

(65) Prior Publication Data

US 2021/0006511 A1  Jan. 7, 2021

(51) Int. Cl.
| | | |
|---|---|---|
| *H04L 12/939* | (2013.01) | |
| *G06F 15/173* | (2006.01) | |
| *H04L 45/00* | (2022.01) | |
| *H04L 45/24* | (2022.01) | |
| *H04L 45/28* | (2022.01) | |
| *H04L 49/351* | (2022.01) | |

(Continued)

(52) U.S. Cl.
CPC ...... *H04L 49/552* (2013.01); *G06F 15/17331* (2013.01); *H04L 45/245* (2013.01); *H04L 45/28* (2013.01); *H04L 45/66* (2013.01); *H04L 49/351* (2013.01); *H04L 2101/622* (2022.05)

(58) Field of Classification Search
CPC ..... H04L 49/552; H04L 45/245; H04L 45/28; H04L 45/66; H04L 49/351; H04L 2101/622; G06F 15/17331; Y02D 30/50
See application file for complete search history.

(56) References Cited

U.S. PATENT DOCUMENTS

| | | | | |
|---|---|---|---|---|
| 10,250,488 B2 * | 4/2019 | Cropper | ................ | H04L 67/535 |
| 11,444,881 B2 * | 9/2022 | Johnsen | ................ | H04L 47/805 |

(Continued)

FOREIGN PATENT DOCUMENTS

DE          10250488 A1 *  5/2004  ............ H02J 7/1423

*Primary Examiner* — Wutchung Chu
(74) *Attorney, Agent, or Firm* — Compass IP Law PC

(57) ABSTRACT

Methods and apparatus for software-controlled active-backup mode of link aggregation for RDMA and virtual functions. A Network Interface Controller (NIC) includes hardware implementing first and second physical functions (PFs) including transmit and receive resources to support data transfers via first and second ports. A bonding group is created with the first and second PFs. The first PF as an active PF and used for primary data transfers while implementing the second PF as a backup PF. On a link or port failure of the active PF, the bonding group is reconfigured to employ transmit and receive resources of the backup PF such that those resources are shared with the active PF. Data transfers are then performed using the shared resources of the active PF and the backup PF. Embodiments may support RDMA data transfers using PF bonding and the solution may be implemented in virtualized environments including virtual machines (VMs) in a manner transparent to the VMs.

21 Claims, 9 Drawing Sheets

(51) Int. Cl.
*H04L 49/552* (2022.01)
*H04L 101/622* (2022.01)

(56) References Cited

U.S. PATENT DOCUMENTS

| | | | |
|---|---|---|---|
| 2008/0114781 A1* | 5/2008 | Yin | H04L 67/1001 |
| 2008/0304519 A1* | 12/2008 | Koenen | H04L 12/10 370/477 |
| 2010/0077409 A1* | 3/2010 | Hernandez | G06F 13/102 719/326 |
| 2010/0115174 A1* | 5/2010 | Akyol | G06F 13/385 710/316 |
| 2012/0042095 A1* | 2/2012 | Kotha | G06F 11/1423 709/250 |
| 2014/0185627 A1* | 7/2014 | Ditya | H04L 45/245 370/409 |
| 2014/0189094 A1* | 7/2014 | Ditya | H04L 45/245 709/224 |
| 2015/0172112 A1* | 6/2015 | Itkin | H04L 45/245 370/254 |
| 2015/0263970 A1* | 9/2015 | Macchiano | H04L 49/70 709/223 |
| 2015/0263991 A1* | 9/2015 | Macchiano | H04L 45/245 370/400 |
| 2016/0050145 A1* | 2/2016 | Tsirkin | H04L 49/9068 718/105 |
| 2017/0289040 A1* | 10/2017 | Sreeramoju | H04L 45/245 |
| 2018/0217833 A1* | 8/2018 | Teisberg | H04L 67/145 |
| 2021/0367890 A1* | 11/2021 | Krivenok | H04L 47/15 |
| 2022/0052904 A1* | 2/2022 | Howard | H04L 47/41 |

\* cited by examiner

SOFTWARE-CONTROLLED ACTIVE-BACKUP MODE OF LINK AGGREGATION FOR RDMA AND VIRTUAL FUNCTIONS

BACKGROUND INFORMATION

Link aggregation (LAG) is a standard method for increasing fault-tolerance and performance of network connections by utilizing multiple ports and bonding links together. The active-backup mode of LAG protects network connections against common failures like faulty or disconnected cables or faulty ports and connectors.

The implementation of LAG for regular LAN (Local Area Network) traffic handled by the operating system (OS) network stack can be done on most network interface controllers (NICs) using software drivers. However, the situation is more complicated when using state-full hardware acceleration mechanisms like Remote Direct Memory Access (RDMA). In such a case, a full software and hardware agnostic solution is impossible to implement or very inefficient. This is also the case for Virtual Functions (VFs) when it is desired to not expose details of bonding to the virtual machines using those VFs. In addition, services that use RDMA (like storage services) or VFs (such as used by multiple virtual machines (VMs) hosted on a server) require high level of protection against failures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1A:
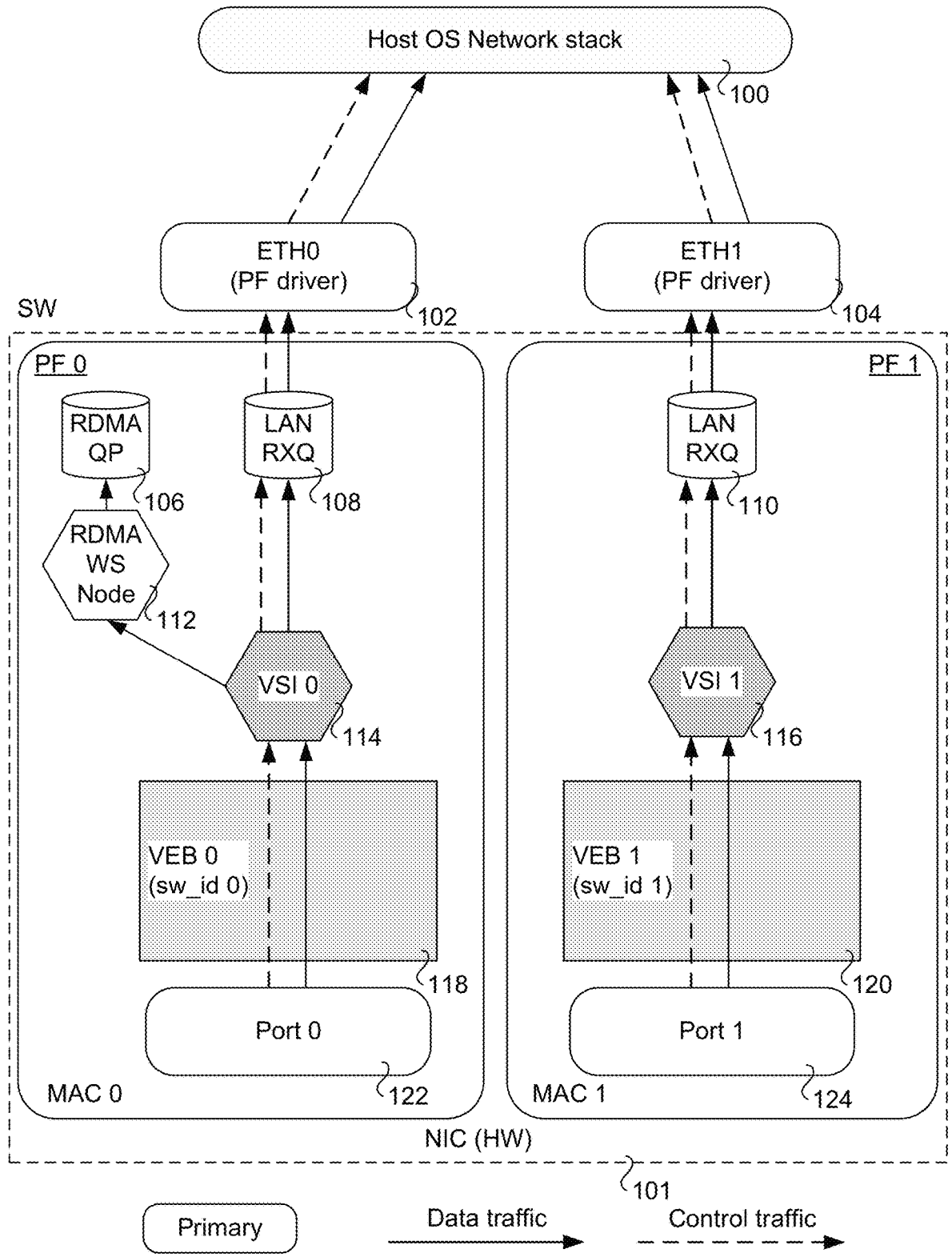
FIG. 1a is a schematic diagram illustrating selected software and NIC PF components associated with receive resources and illustrating a retrieve path before creating a bonding group.

Embodiments of methods and apparatus for software-controlled active-backup mode of link aggregation for RDMA and virtual functions are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments disclosed herein, a novel approach for implementing an active-backup mode of LAG for state full hardware accelerated functions like RDMA or for Virtual Function (VFs) using multiple links served by the NIC card is provided. The embodiments employ LAG-aware PF drivers, where "LAG-aware" means the PF drivers are aware of other PF drivers used in bonding groups to facilitate link aggregation.

Under one aspect, initially RDMA queues and VFs are served by the Physical Function (PF) that represents the active link. During a failover, the RDMA transmission queues are moved from their original PF to new active queues. The receive (RX) traffic received on the new active link is redirected to the RX queues served by the previous link. The LAN traffic is then redirected back to the new active driver interface in software, while the RDMA traffic is served by the same queues accessible by the application (s). A similar approach like for RDMA queues is used for the transmission and RX queues served by the VFs.

The embodiments support several novel methods, including but not limited to:

- A method of sharing selected hardware (HW) resources between two or more PFs that form a bonding group;
- A method of redirecting transmitted traffic by moving selected queues from a hardware scheduler that serves one link to the scheduler that serves another link; and
- A method of splitting received traffic from a new active port to original RDMA/VF queues and a new active LAN PF driver.

In accordance with some embodiments, a single NIC card includes multiple ports, each supporting a separate link. Each port is exposed to the host via a separate PCIe (Peripheral Component Interconnect Express) Physical Function. A hardware-agnostic bonding driver exists in the OS. The bonding driver implements a LAG active-backup mode for the regular LAN traffic from/to the OS network stack. The bonding driver uses hardware-dependent low-level drivers to send and receive network packets over each link. Such configuration is typical for the operating system and is used, for example, in Linux. However, existing bonding drivers do not address stateful offloading mechanisms like RDMA for the traffic that is not handled by the host OS network stack. Also bonding for virtual machines using VFs cannot be implemented in a way transparent for the VM.

In one aspect, it is assumed that NIC hardware/firmware support a hierarchical scheduling mechanism that serves multiple transmission queues. Separate scheduling is performed or each output port and the hierarchical configuration of multiple queues for such ports can be logically represented as a tree (it does not imply any physical implementation of the scheduling mechanism).

Creation of a Bonding Group

The bonding driver is responsible for creating a logical group of bonded links. This operation is called linking. The NIC exposes its links to the software on the host via separate Physical Functions. The PFs provide a logical separation between links and internal NIC resources used by them. Each PF is served by a separate instance of the NIC-specific network driver. During linking, NIC drivers become helpers managed by a master bonding driver. Helper NIC drivers no longer communicate directly with the OS network stack but with the master bonding driver. The bonding driver communicates with the rest of the OS network stack. During the linking operation, the bonding driver informs the NIC drivers that they are bounded and provides a list of other helpers that belongs to the same binding group. In one embodiment this done using a standard OS notification mechanism.

The foregoing creation of a bonding group is generic and already used in Linux. However, embodiments described and illustrated below add operations performed during link events by the NIC driver and firmware. The operations include sharing resources of Physical Functions. On a link event, each LAG-aware NIC driver that belongs to the newly created group reconfigures its PF to allow sharing resources with other PFs that belongs to the same group. To share resources, each PF involved in the group performs the sharing operation. This also prevents unauthorized access from PFs that do not belong to the same group from accessing resources of another PF in the group. In addition, an opposite unlink operation is performed when a LAG group is deleted or its membership is changed. In one embodiment, the LAG-aware NIC driver performs un-share operation on its PF so the resources that belong to this PF cannot be accessed by other PFs.

Another additional operation is reconfiguration of the receiving path. During bonding group creation, the receiving path of the NIC is reconfigured. Existing Virtual Ethernet Bridges (VEBs) serving each link independently are merged into a single VEB. A new combined VEB has extra rules that forward packets of control protocols (like ARP, LACP or LLDP or other alive packets) received on the backup link to the queues served by the backup driver. The rest of the traffic received on the backup link is dropped. Traffic received on the active link is sent to the active LAN or RDMA queues.

Figure 1B:
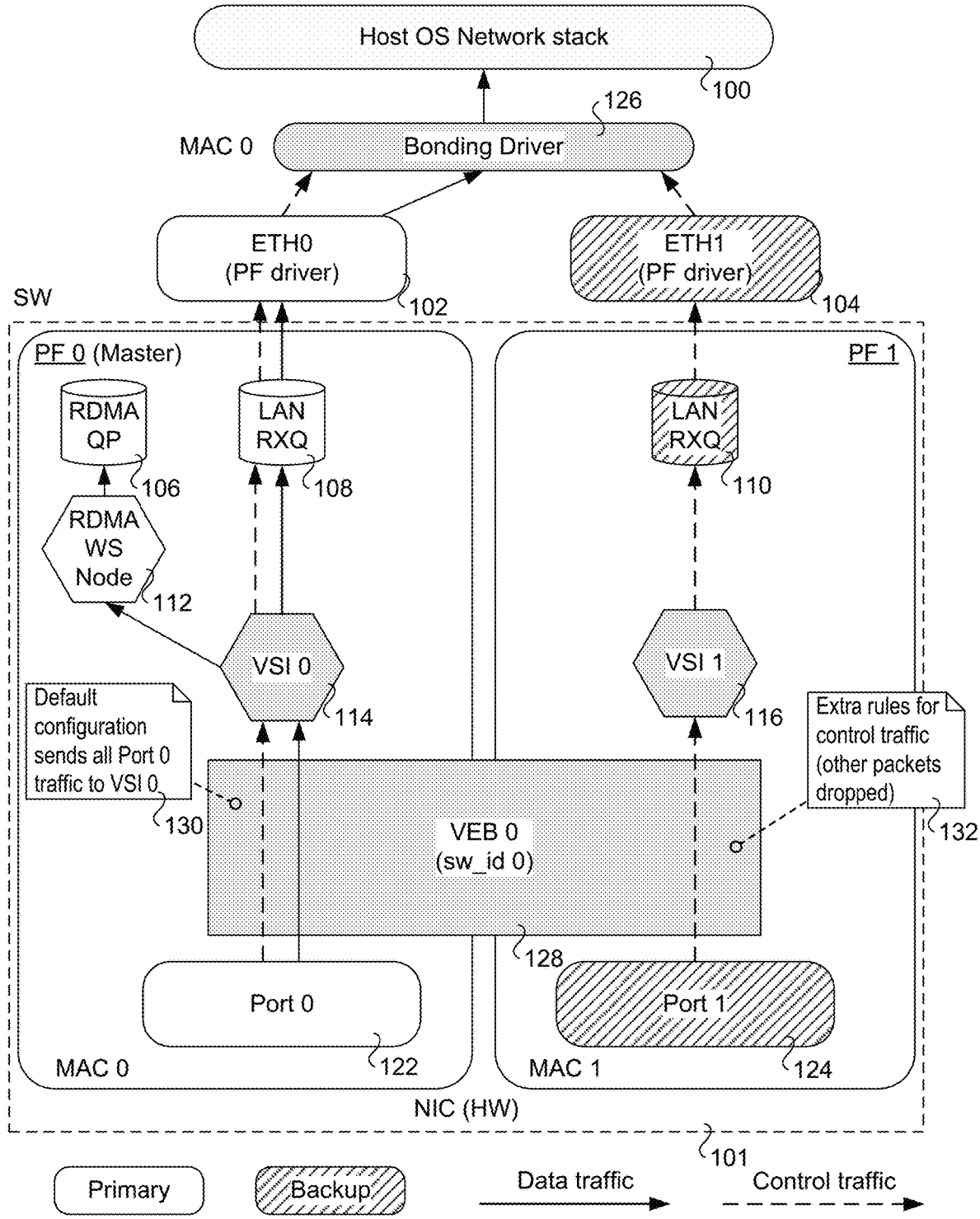
FIG. 1b is a schematic diagram illustrating selected software and NIC PF components associated with receive resources and illustrating a retrieve path after creating a bonding group.

Examples of the configuration of the receive path before and after creation a bonding group is shown in FIGS. 1a and 1b. The high-level components of both configurations include a host OS network stack 100 and a NIC 101 on which a first physical function PF 0 and a second physical function PF 1 are implemented. In addition to host OS network stack 100, the software (SW) components include a PF driver 102 and a PF driver 104 (also respectively labeled ETH0 and ETH1). Under the illustrated embodiments herein, PF drivers 102 and 104 are LAG-aware NIC drivers. Under Linux terminology, PF drivers 102 and 104 may comprise PF net devices; accordingly, as used herein, PF drivers may also represent PF net devices.

Physical function PF 0 includes an RDMA queue pair (QP) 106, an LAN receive queue (RXQ) 108, an RDMA work schedular (WS) node 112, a first Virtual Station Interface (VSI) 114 (also shown and referred to as VSI 0), a first VEB 118 (also shown and referred to as VEB 0), and a port 122. Physical function PF 1 includes an LAN RXQ 110, a second VSI 116 (also shown and referred to as VSI 1), a second VEB 120 (also shown and referred to as VEB 1 and having a second software identifier sw_id 1), and a port 124. Physical functions PF 0 and PF 1 are implemented in hardware on NIC 101 as described in further detail below. PF 0 implements a first MAC (Media Access Channel) Layer 0 (MAC 0), while PF 1 implemented a second MAC Layer 1 (MAC 1).

As shown by the single ended arrows used to depict data traffic and control traffic, physical functions PF 0 and PF 1 operate independently and forward traffic from their respective ports 122 and 124 through the same paths including a VEB, a VSI, a LAN RXQ, and an OS Ethernet device. Control traffic is forward from OS Ethernet devices 102 and 104 to OS TCP/IP stack 100.

The after-bonding configuration of FIG. 1b further includes a bonding driver 126, which is implemented using first MAC 0. The separate VEBs 118 and 120 are replaced with a single VEB 128 with a software ID of 0 (sw_id 0). Physical function PF 0 is now implemented as a master PF, while physical function PF 1 is implemented as a helper. As shown by the components with the cross-hatched background, port 124, LAN RXQ 110 and PF driver 104 are implemented as backup resources, while the remaining components shown with a white background are primary resources.

As shown by a note 130, the default configuration for master PF 0 sends all Port 0 (port 122) traffic to VSI 0. As shown by a note 132, for the packet flow for packets received at back Port 1 (port 124), extra rules for control traffic LACP+ARP+LLDP are added in VEB 128, while other packets are dropped. For example, the extra rules may include but are not limited to control traffic such as LACP (Link Aggregation Control Protocol), ARP (Address Resolution Protocol), and LLDP (Link Layer Discovery Protocol).

In the active-backup mode of the LAG, one link is selected as an active link (i.e., the primary link). To support LAG for RDMA and VFs, RDMA queues and VFs are allocated from the PF that serves the active link. In one embodiment, RDMA queues are created after bonding group creation. The PFs that serve backup links are active but cannot serve RDMA or VFs. Such behavior is controlled by the LAG-aware NIC driver instances responsible for those PFs (e.g., PF drivers 102 and 104).

Transmission Reconfiguration During Failover

When the bonding driver detects or determines that an active link has failed, it performs a failover operation. A link failure may be the result of a port failure, a failure of a physical link (such as a network cable is removed or damaged), or the failure of a port on a network device such as an Ethernet switch). In response to the link or port failure, the bonding driver re-direct outgoing LAN traffic sent by the OS network stack to the LAG-aware NIC (PF) driver serving a new active link (that has replaced the failed link). The bonding driver sends a failover event notification to all PF drivers that belongs to the bonding group. In addition to the foregoing conventional operations, an embodiment of the novel solution performs additional operations during failover operations by the NIC driver and firmware. The RDMA TX queues registered in the scheduler tree serving the previous active link are moved to the scheduler tree serving the new active link. QoS settings are configured in the same way as before the failover, while configuration of the LAN queues remain unchanged. Reconfiguration of the scheduler is transparent for the software using RDMA queues. In this way LAN traffic is controlled by the bonding driver, while RDMA traffic can still use the same hardware resources as before failover.

Figure 2A:
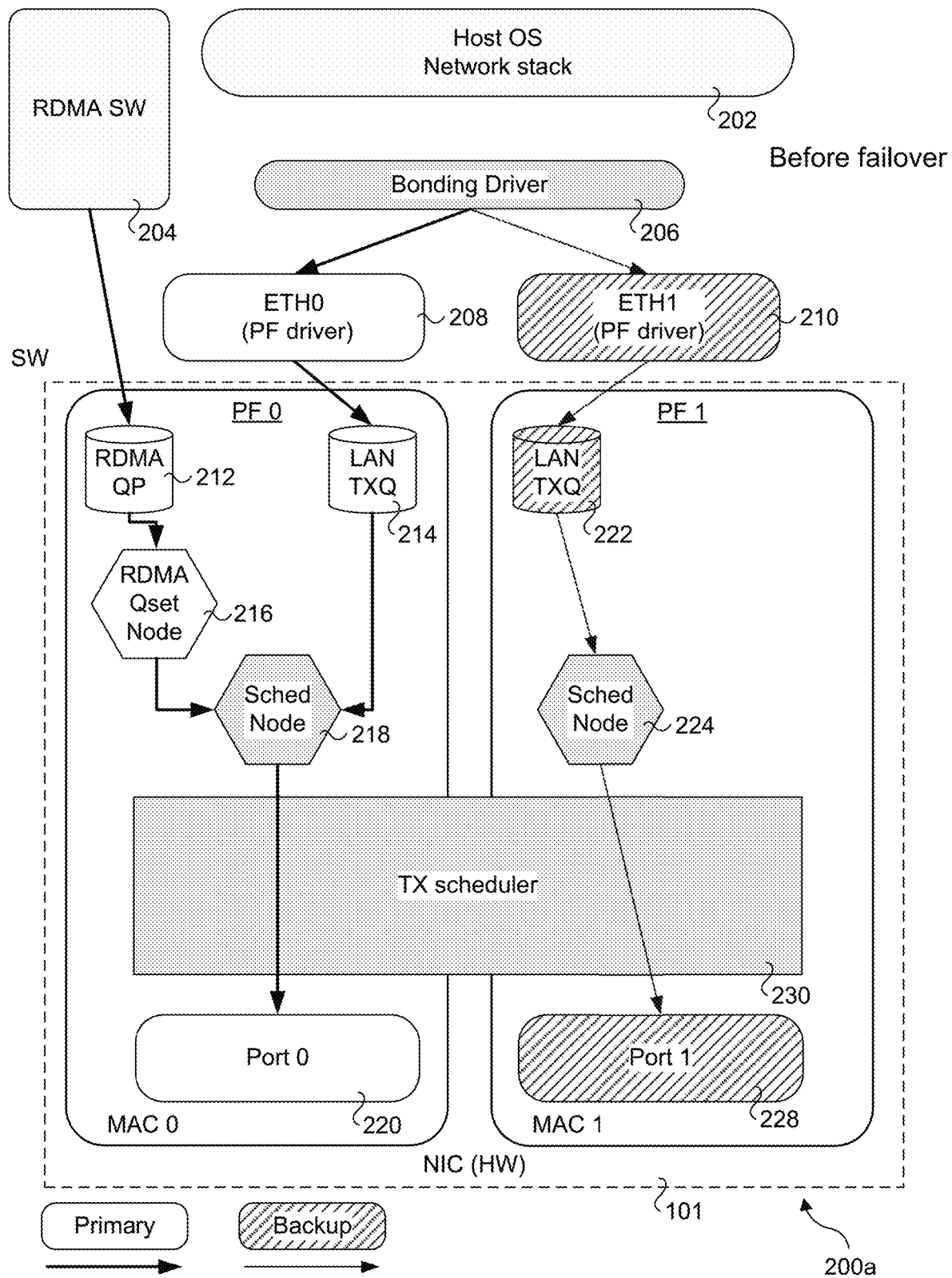
FIG. 2a is a schematic diagram illustrating selected software and NIC PF components associated with transmit resources and illustrating a transmit path for a first configuration under which PF 0 is the active PF before a failover.

The reconfiguration of the transmission path during failover is illustrated in FIGS. 2a (configuration 200a before failover) and 2b (configuration 200b following failover). Configurations 200a and 200b share the same components including a host OS TCP/IP stack 202, RDMA software 204, a bonding driver 206, a PF driver 208 and a PF driver 210, all of which are software components. The hardware components are implemented on the NIC 101, which includes physical functions PF 0 and PF 1, as before. Physical function PF 0 includes an RDMA QP 212, an LAN TXQ 214, an RDMA Qset node 216, a schedular node 218 and a first port 220 (Port 0). RDMA Qset node 216 includes a set of RDMA transmit-side queues associated with RDMA transmit functions. Physical function PF 1 includes an LAN TXQ 222, a scheduler node 224 and a second port 228. Physical functions PF 0 and PF 1 share a TX scheduler 230.

Under the before-failure configuration 200a of FIG. 2a, the active (primary) outbound transmission path beginning at bonding driver 206 includes PF driver 208, LAN TXQ 214, scheduler node 218, TX scheduler 230 and port 220. The active RDMA path is from RDMA software 204 to RDMA QP 212 to RDMA Qset node 216 to scheduler node 218 through TX scheduler 230 to port 220.

Figure 2B:
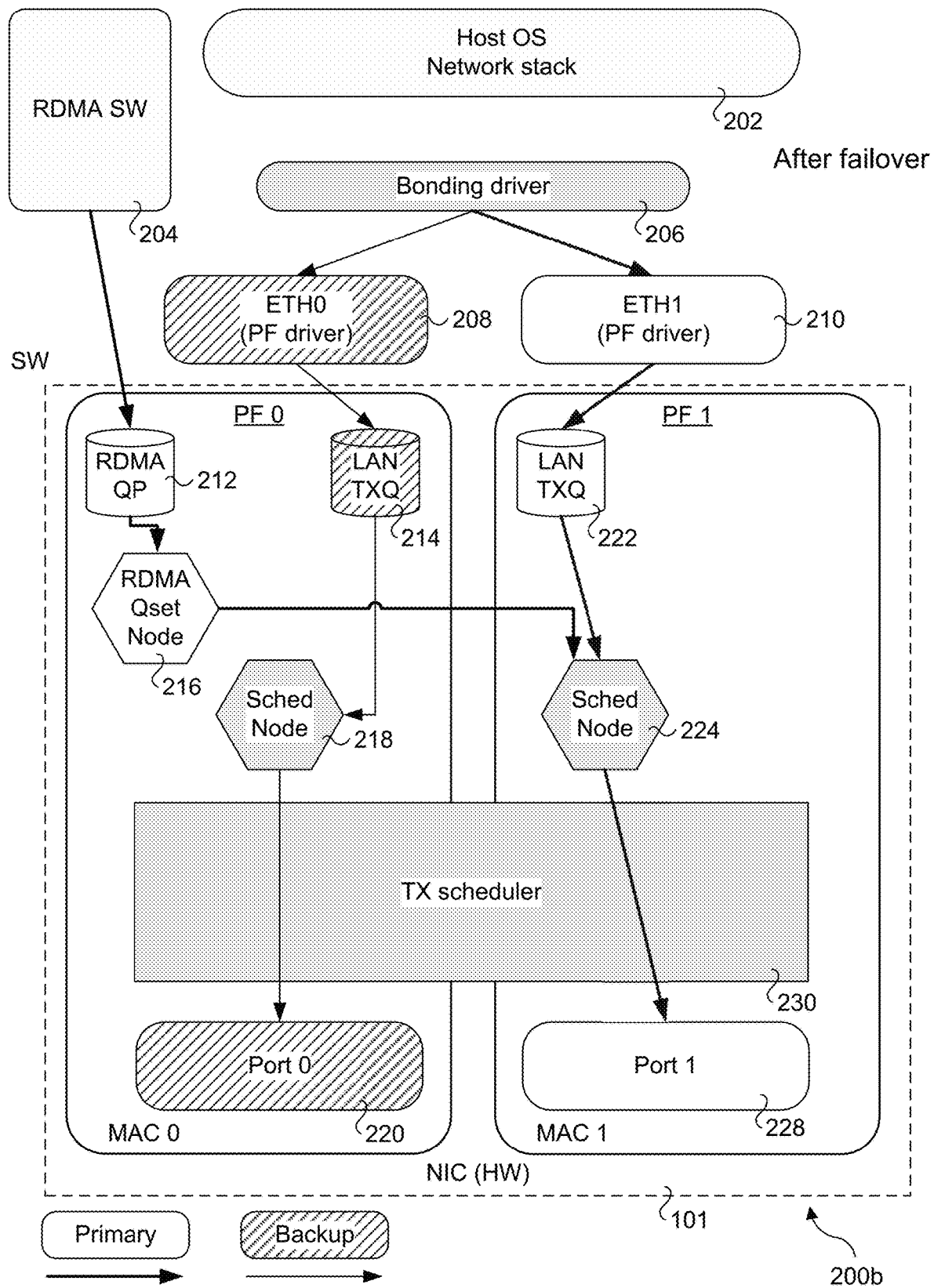
FIG. 2b is a schematic diagram illustrating a reconfiguration of the PF components associated with transmit resources and illustrating a transmit path for a second configuration following a failover under which transmit resources in both PF 0 and PF 1 are shared.

Under the after-failover configuration 200b of FIG. 2b, the active (primary) outbound transmission path beginning at bonding driver 206 includes PF driver 210, LAN TXQ 2222, scheduler node 2224, TX scheduler 230 and port 228. The active RDMA path is from RDMA software 204 to RDMA QP 212 to RDMA Qset node 216 to scheduler node 224 through TX scheduler 230 to port 228.

Receiving Side Reconfiguration During Failover

During failover operation, the bonding driver stops receiving data traffic from the faulty link and start receiving data traffic from the new active link, in a manner similar to today's Linux link bonding. Embodiments herein further perform additional operations during failover operation by the NIC driver and firmware to properly receive incoming traffic. Receiving rules are modified in the VEB by the LAG-aware NIC driver. Incoming traffic received via the new active link is forwarded to the queues used by the previous active link. RDMA traffic is still handled by RDMA software; the failover is transparent from its point of view. LAN traffic is redirected by the NIC driver to the new active OS Ethernet device so the bonding driver recognized it as received from the new active link. The control traffic received on the old active link is redirected to the old backup queues, but the NIC driver redirects it back to the new backup OS Ethernet device (the new backup PF driver). The bonding driver recognizes the control traffic as received from the old active/new backup link.

Figure 3A:
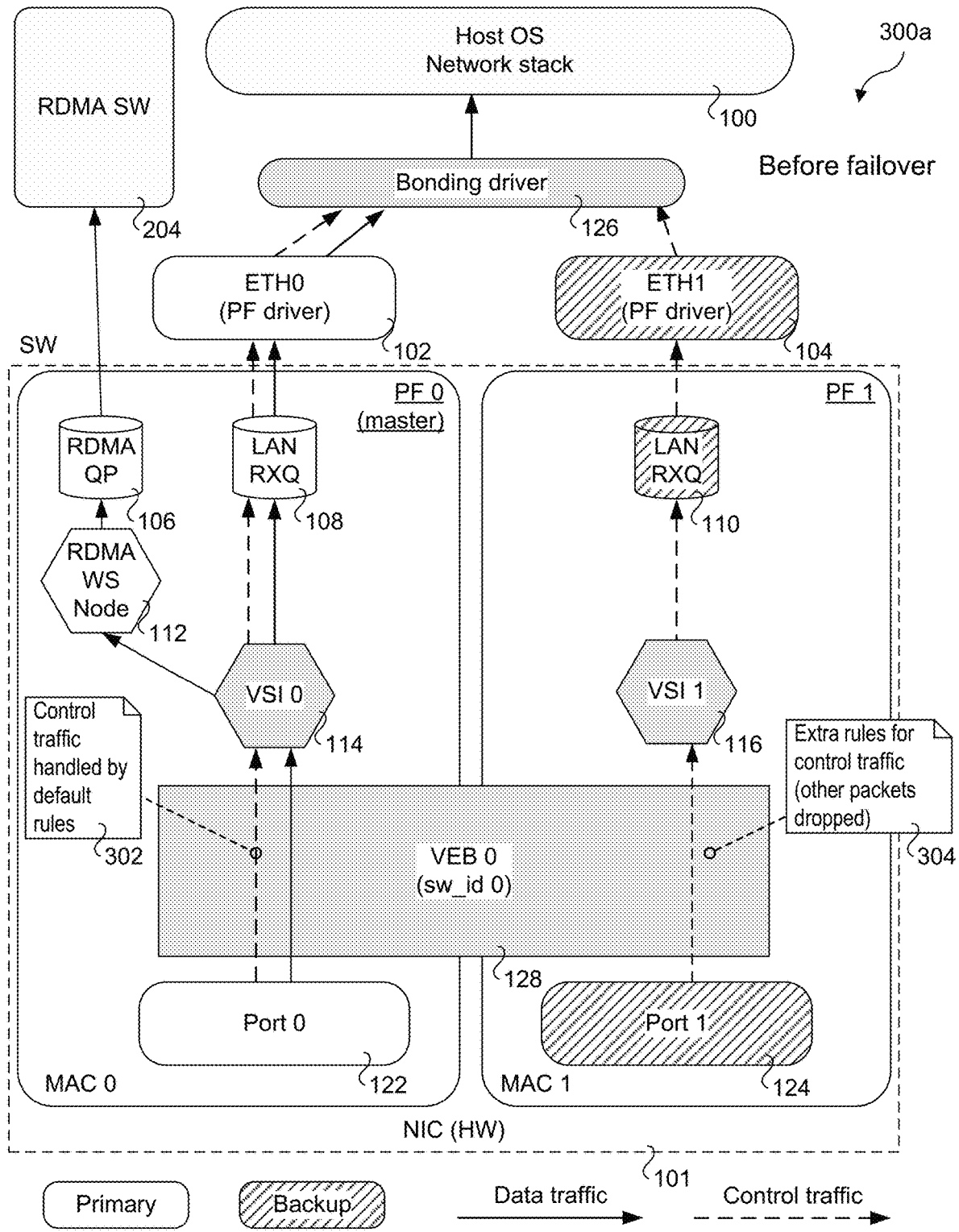
FIG. 3a is a schematic diagram illustrating selected software and NIC PF components associated with receive resources and illustrating receive paths for a first configuration under which PF 0 is the active PF before a failover.
Figure 3B:
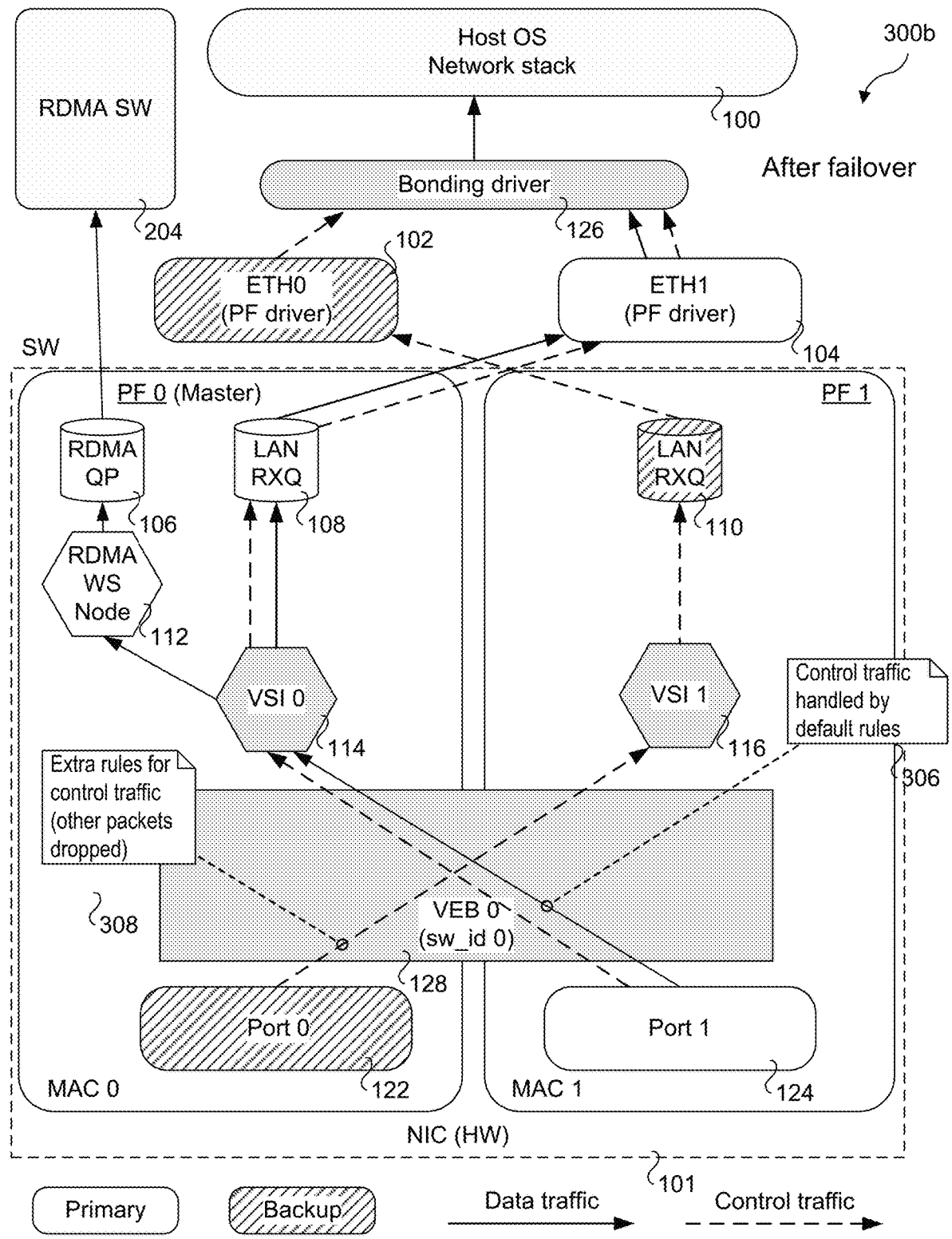
FIG. 3b is a schematic diagram illustrating a reconfiguration of the PF components associated with receive resources and illustrating receive paths for a second configuration following a failover under which receive resources in both PF 0 and PF 1 are shared.

The reconfiguration of RX path during failover is illustrated in FIG. 3a (configuration 300a before failover) and FIG. 3b (configuration 300b following failover). The software and hardware components are the same as that shown in FIG. 1b (after bonding), with the addition of RDMA software 204. Under configuration 300a, port 122 is the active port and the active receive path is port 122 through VEB 128 to VSI 114 to LAN RXQ 108 to OS Ethernet device 102 to bonding driver 126 to host OS TCP/IP stack 100. The active RDMA path is port 122 through VEB 128 to VSI 114 to RDMA WS Node 112 to RDMA QP 106 to RDMA software 204. As shown by a note 302 in FIG. 3a, control traffic are handled by default rules. Meanwhile, the backup path (which is only used for RX control traffic) is from port 124 through VEB 128 to VSI 116 to LAN RXQ 110 to OS Ethernet device 104 to bonding driver 126 to host OS TCP/IP stack 100. As shown by a note 304, extra rules are applied for control traffic while other packets are dropped.

Following the RX path reconfiguration shown in configuration 300b of FIG. 3b, the active port is port 124 and the active path for RX data traffic and RX control traffic is port 124 through VEB 128 to VSI 114 to LAN RXQ 108 to OS Ethernet device 104 to bonding driver 126 to host OS TCP/IP stack 100. The active RDMA path is port 124 through VEB 128 to VSI 114 to RDMA WS Node 112 to RDMA QP 106 to RDMA software 204. As depicted by a note 306, LACP+ARP+LLDP traffic are handled by default rules. The backup path for the RX control traffic is from port 122 to VSI 116 to LAN RXQ 110 to OS Ethernet device 102 to bonding driver 126. As shown by a note 308, extra rules are applied for control traffic while other packets are dropped.

Virtual Function Extensions

Virtual Functions can be attached directly to the VMs running on the host using SR-IOV (Single Root Input-Output Virtualization) technology. The guest OS running on the VM is not aware of details of the host networking, but has direct access to the NIC hardware.

The presented solution, described above for RDMA, can be also used for implementation of LAG for Virtual Functions (VFs) in such a way that VMs are not aware of it. For the TX side, VF queues are handled by the scheduler tree in a similar way as the RDMA queues. During failover, VF queues can be moved to the scheduler tree responsible for the new active link in the same way as for the RDMA queues.

For the RX side, VF queues are still handled by the same hardware resources like VSI. VEB is reconfigured in the same way as for the RDMA case. The main difference for handling VF and RDMA queues lay in cooperation with the remote Ethernet switch. In an existing solution used for Linux, the switch is informed about failover by the bonding driver. The bonding driver sends a packet with the MAC address used by the bonding driver over a new active link.

This causes reconfiguration of internal forwarding tables of the switch, so the traffic to this MAC address is sent via a new active link.

Each VF have a unique MAC address. Embodiments of the novel failover solution extends this behavior by sending packets with MAC addresses of all VFs over a new active link. In one embodiment, Ethernet LOOPBACK packets are used for this purpose. This operation is done by the LAG-aware NIC driver for PF function.

Figure 4:
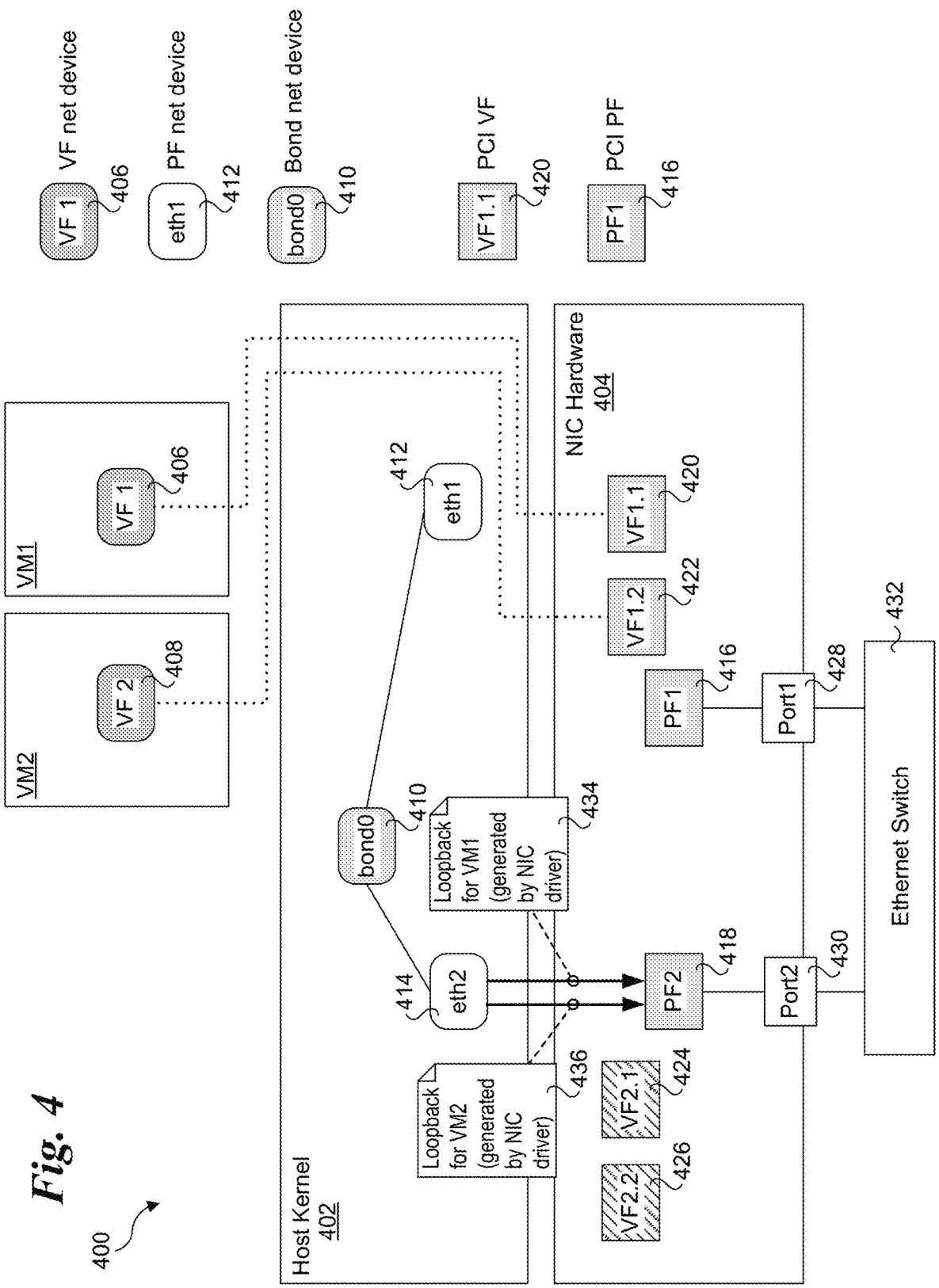
FIG. 4 is a schematic diagram of an Ethernet loopback architecture, according to one embodiment.

An example Ethernet loopback architecture 400 is shown in FIG. 4. Architecture 400 includes host kernel 402 and NIC hardware 404. Host kernel 402 is used to host virtual machines VM1 and VM2 in which respective VF net devices 406 and 408 are implemented. Host kernel 402 includes a bond net device 410, and PF net devices 412 and 414 (also respectively labeled as eth0 and eth1). NIC hardware 404 includes PCI physical functions 416 and 418 (PF1 and PF2), PCI VFs 420, 422, 424, and 426 (respectively labeled VF1.1, VF1.2, VF2.1 and VF2.2) and ports 428 and 430. PCI VFs 420 and 422 are the current active resources, while PCI VFs 424 and 426 are backup resources. Ports 428 and 430 are connected to an Ethernet switch 432.

As depicted in notes 434 and 436, PF net device 414 sends Ethernet LOOPBACK packets for virtual machines VM1 and VM2 to physical function 418 (PF2). The loopback packets are generated by the NIC drivers in each of VM1 and VM2 (not shown). The loopback packets are sent on behalf of the VMs to inform Ethernet switch 432 of the failover.

Extensions to Use Resources of the Backup PF

In the foregoing embodiments, only resources (like VFs or RDMA queues) that belongs to the active PF are used. However, it is possible to extend these embodiments to also use resources from the backup PF. This approach may better utilize existing hardware resources of the NIC.

In the case of bonding, handling RDMA queues or VFs from the backup PF is similar to the approach described above for the resources from the active PF. The difference is that in the initial case those resources are configured in a way like after a failover—so a different scheduling tree is used for transmission, while specific receive rules based on destination MAC address redirect incoming traffic to the right queues. When the link error occurs and the failover is performed, resources of the PF that owns the faulty ports are reconfigured in a way described above, while the resources that belongs to the other PF are configured in the initial way.

Figure 5:
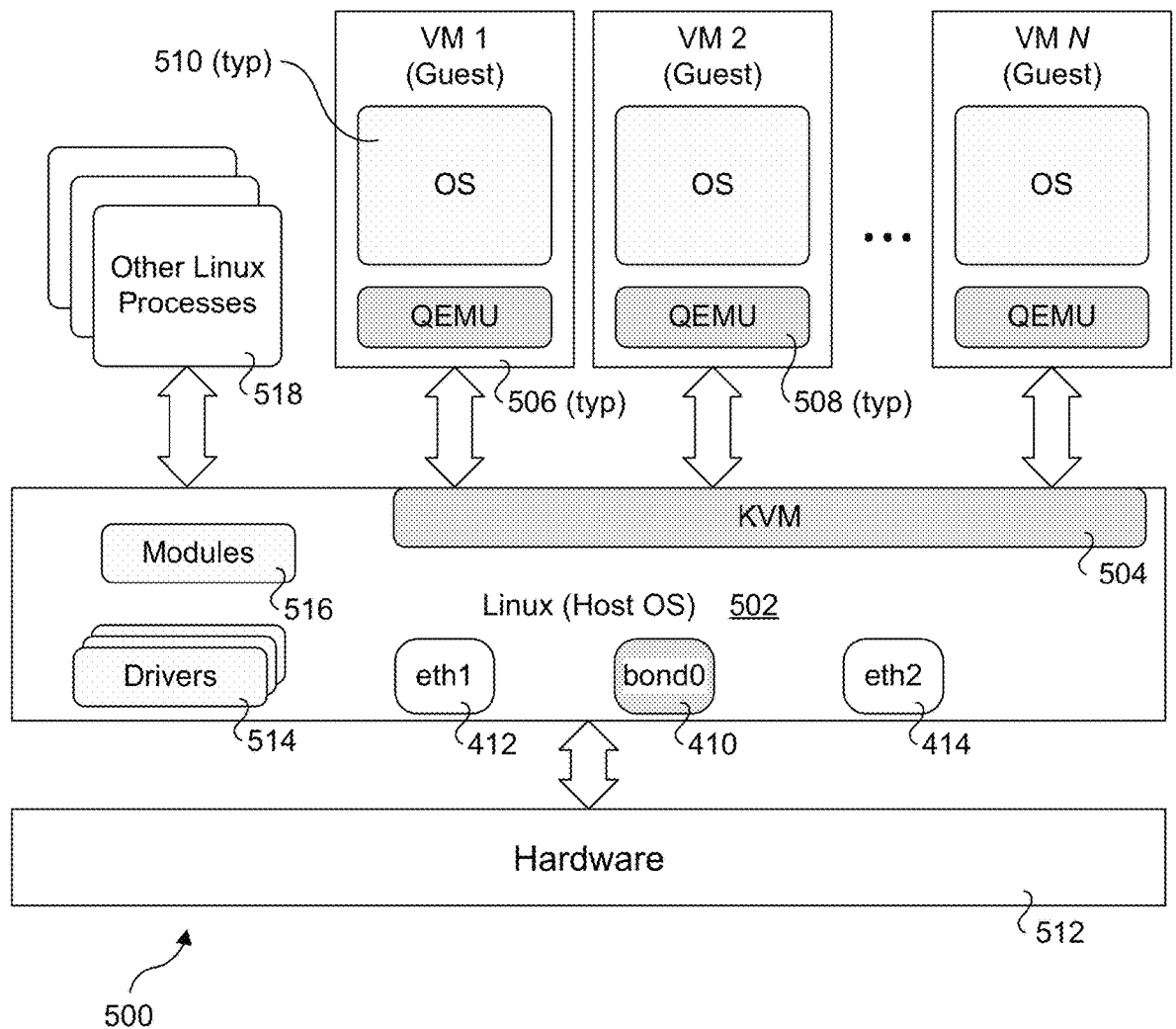
FIG. 5 is a block diagram of a Linux KVM (Kernel-based Virtual Machine) architecture used to host multiple virtual machines.

In one embodiment, aspects of the foregoing embodiments may be implemented using a Linux KVM (Kernel-based Virtual Machine) architecture, such as illustrated in Linux KVM architecture 500 of FIG. 5. Under modern versions of Linux, Hypervisor functionality is tightly integrated into the Linux code base and provide enhanced performance when compared with VMM and Type-2 Hypervisors that are run as application in the host's user space. As a result, Linux KVM architectures are widely deployed in datacenters and/or to support cloud-based services.

As illustrated in FIG. 5, Linux KVM architecture 500 employs a Linux operating system 502 including KVM 504 that is used to host N virtual machines 506, which the VMs are also referred to as guests. Each VM 506 includes QEMU 508. QEMU (short for Quick EMUlator) is a generic and open source machine emulator that performs platform hardware virtualization and is a hosted virtual machine monitor (VMM). QEMU, which is available from https://www.qemu.org/, is commonly implemented as a VM in today's cloud environments. An instance of an OS 510 is run in each VM 506. Under Linux KVM architecture 500, the OS is implemented as a user space process using QEMU for x86 emulation. Other components illustrated in Linux KVM architecture 500 include a hardware layer 512, a bond net device 410, PF net devices 412 and 414, other Linux drivers 514, Linux modules 516 and other Linux processes 518. As will be recognized by those skilled in the virtualization art, the Linux KVM architecture also includes additional components that are implemented in VMs 506 that are not shown for simplicity. This KVM implementation is referred to as a Hypervisor, observing that unlike some Hypervisor architectures, under the Linux KVM architecture the Hypervisor components are not implemented in a single separate layer (e.g., such as a Type-2 Hypervisor), but rather include software components in the Linux kernel as well as software components in the VMs (implemented in the host's user space).

Figure 6:
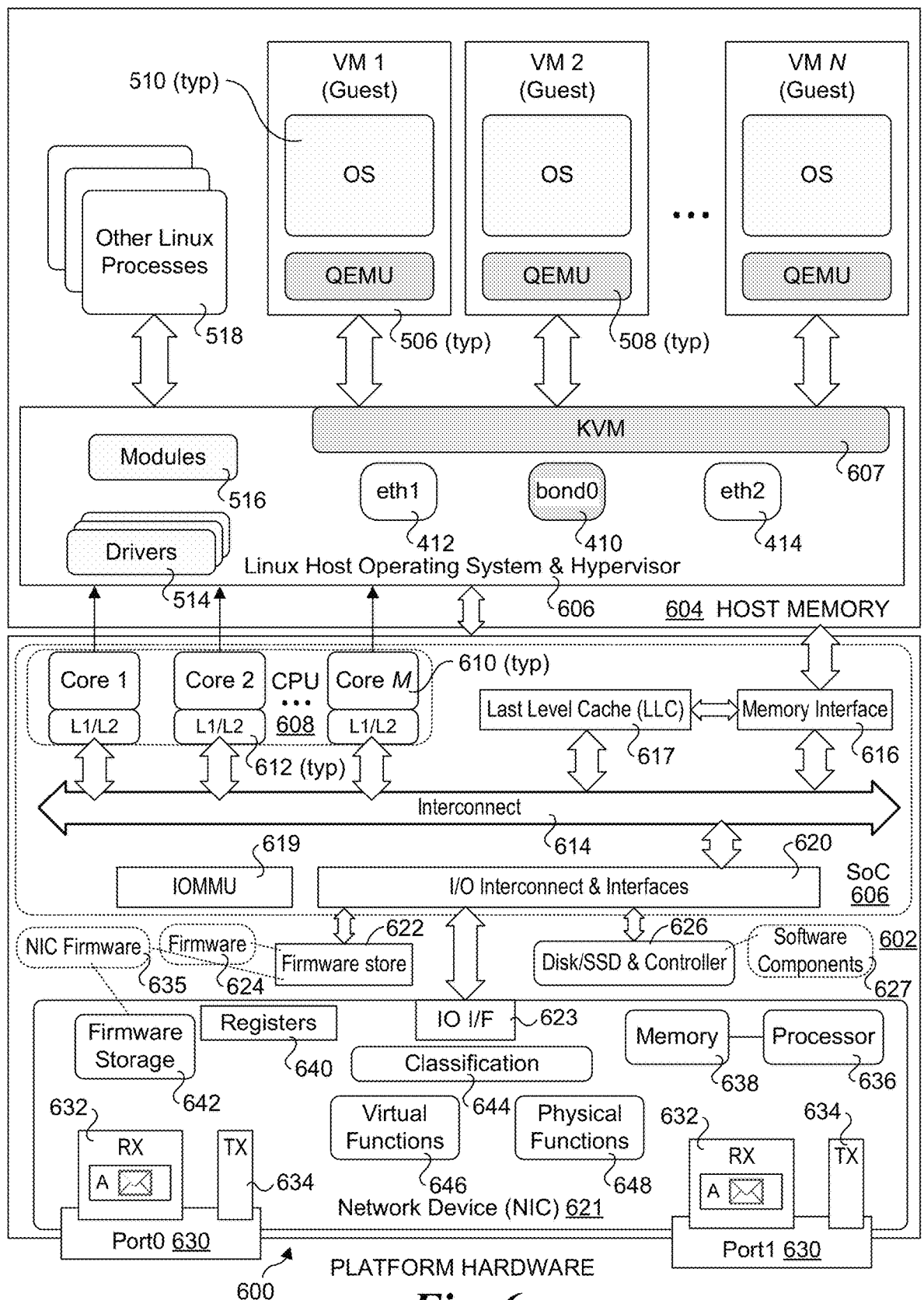
FIG. 6 is a schematic diagram of a platform architecture configured to implement aspects of the embodiments disclosed above using a System on a Chip (SoC) connected to a network device comprising a NIC, according to one embodiment.

FIG. 6 shows one embodiment of a platform architecture 600 corresponding to a computing or host platform suitable for implementing aspects of the embodiments described herein. Architecture 600a includes a hardware layer in the lower portion of the diagram including platform hardware 602, and a software layer that includes software components running in host memory 604 including a Linux host operating system and Hypervisor 606 with KVM 607.

Platform hardware 602 includes a processor 606 having a System on a Chip (SoC) architecture including a central processing unit (CPU) 608 with M processor cores 610, each coupled to a Level 1 and Level 2 (L1/L2) cache 612. Each of the processor cores and L1/L2 caches are connected to an interconnect 614 to which each of a memory interface 616 and a Last Level Cache (LLC) 618 is coupled, forming a coherent memory domain. Memory interface is used to access host memory 604 in which various software components are loaded and run via execution of associated software instructions on processor cores 610.

Processor 606 further includes an IOMMU (input-output memory management unit) 619 and an IO interconnect hierarchy, which includes one or more levels of interconnect circuitry and interfaces that are collectively depicted as IO interconnect & interfaces 620 for simplicity. In one embodiment, the IO interconnect hierarchy includes a PCIe root controller and one or more PCIe root ports having PCIe interfaces. Various components and peripheral devices are coupled to processor 606 via respective interfaces (not all separately shown), including a network device comprising a NIC 621 via an IO interface 623, a firmware storage device 622 in which firmware 624 is stored, and a disk drive or solid state disk (SSD) with controller 626 in which software components 628 are stored. Optionally, all or a portion of the software components used to implement the software aspects of embodiments herein may be loaded over a network (not shown) accessed, e.g., by NIC 621. In one embodiment, firmware 624 comprises a BIOS (Basic Input Output System) portion and additional firmware components configured in accordance with the Universal Extensible Firmware Interface (UEFI) architecture.

During platform initialization, various portions of firmware 624 (not separately shown) are loaded into host memory 604, along with various software components. In addition to host operating system 606 the software components may include software components shown the embodiments shown in FIGS. 2a, 2b, 3a, 3b, 4 and 5. Moreover, other software components may be implemented, such as various components or modules associated with the Hypervisor, VMs, and applications running in the guest OS.

NIC 621 includes two or more network ports 630 (as depicted by Port0 and Port1), with each network port having an associated receive (RX) queue 632 and transmit (TX)

queue 634. NIC 621 includes circuitry for implementing various functionality supported by the NIC, including support for operating the NIC as an SR-IOV PCIe endpoint similar to NIC 108 in FIGS. 1 and 3. For example, in some embodiments the circuitry may include various types of embedded logic implemented with fixed or programmed circuitry, such as application specific integrated circuits (ASICs) and Field Programmable Gate Arrays (FPGAs) and cryptographic accelerators (not shown). NIC 621 may implement various functionality via execution of NIC firmware 635 or otherwise embedded instructions on a processor 636 coupled to memory 638. One or more regions of memory 638 may be configured as MMIO memory. NIC further includes registers 640, firmware storage 642, classifier 644, one or more virtual functions 646, and two or more physical functions 648. Generally, physical functions 648 are representative of the PFs shown in FIGS. 2*a*, 2*b*, 3*c*, 3*b*, and 4 and discussed above.

Additional logic (not shown) may be implemented for performing various operations relating to packet processing of packets received for one or more networks, including packet/flow classification and generation of hardware descriptors and the like. Generally, NIC firmware 635 may be stored on-board NIC 621, such as in firmware storage device 642, or loaded from another firmware storage device on the platform external to NIC 621 during pre-boot, such as from firmware store 622.

Generally, CPU 608 in SoC 606 may employ any suitable processor architecture in current use or developed in the future. In one embodiment, the processor architecture is an Intel® architecture (IA), including but not limited to an Intel® x86 architecture, and IA-32 architecture and an IA-64 architecture. In one embodiment, the processor architecture is an ARM®-based architecture.

FIG. 6*b* shows an embodiment of a platform architecture 600*b* on which the software components of a host platform architecture 100 of FIG. 1 are implemented. As indicated by like-reference number, the remainder of the software components from Linux host OS and Hypervisor 606 downward are the same in both platform architectures 600*a* and 600*b*.

In addition to implementations using SR-IOV, similar approaches to those described and illustrated herein may be applied to Intel® Scalable IO Virtualization (SIOV). SIOV may be implemented on various IO devices such as network controllers, storage controllers, graphics processing units, and other hardware accelerators. As with SR-IOV, SIOV devices and associated software may be configured to support pass-through DMA data transfers both from the SIOV device to the host and from the host to the SIOV device.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other. Additionally, "communicatively coupled" means that two or more elements that may or may not be in direct contact with each other, are enabled to communicate with each other. For example, if component A is connected to component B, which in turn is connected to component C, component A may be communicatively coupled to component C using component B as an intermediary component.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

Italicized letters, such as 'M', 'N', etc. in the foregoing detailed description are used to depict an integer number, and the use of a particular letter is not limited to particular embodiments. Moreover, the same letter may be used in separate claims to represent separate integer numbers, or different letters may be used. In addition, use of a particular letter in the detailed description may or may not match the letter used in a claim that pertains to the same subject matter in the detailed description.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a non-transitory computer-readable or machine-readable storage medium. A non-transitory computer-readable or machine-readable storage medium includes any mechanism for storing or transmitting information in a form readable by a machine (e.g., a computer). For example, a non-transitory computer-readable or machine-readable storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A non-transitory computer-readable or machine-readable storage medium may also include a storage or database from which content can be downloaded. The non-transitory computer-readable or machine-readable storage medium may also include a device or product having content stored thereon at a time of sale or delivery. Thus, delivering a device with stored content, or offering content for download over a communication medium may be understood as providing an article of manufacture comprising a non-transitory computer-readable or machine-readable storage medium with such content described herein.

The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including non-transitory computer-readable or machine-readable storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method of sharing hardware resources between two or more physical functions (PFs) on a compute platform having a network interface controller (NIC) with a plurality of ports and configured to implement a plurality of PFs and a processor executing software including a bounding driver and two or more link aggregation (LAG)-aware NIC drivers, the method comprising:
    associating LAG-aware NIC drivers with PFs among the plurality of PFs including associating first and second LAG-aware NIC drivers with respective first and second PFs;
    creating a bonding group comprising two or more PFs among the plurality of PFs including the first and second FPs; and
    in response to a link failure of a first active link,
    employing LAG-aware NIC drivers associated with PFs in the bonding group to reconfigure, by the bonding driver, the PFs to allow sharing resources with one or more other PFs that belong to the bonding group.

2. The method of claim 1, further comprising reconfiguring a receiving path (Original) of the NIC, wherein the reconfigured receiving path traverses shared resources associated with two or more PFs and is utilized by a second active link following link failure of the first active link.

3. The method of claim 2, wherein each PF, prior to creating the bonding group has a receiving path that includes a respective port and a respective Virtual Ethernet Bridge (VEB), and wherein under the reconfigured receiving path the respective VEBs are merged into a single VEB.

4. The method of claim 2, wherein reconfiguring the receive path further comprises:
    configuring a first receive path through a first FP comprising a primary receive path originating at a first port;
    configuring a second receive path through a second PF comprising a backup receive path originating at a second port;
    forwarding both control traffic and data traffic received at the first port via the first receive path; and
    forwarding control traffic received at the second port via the backup receive path while dropping packets associated with data traffic received at the second port.

5. The method of claim 1, further comprising:
    implementing a first PF as an active PF and using the first PF for data transfers while implementing one or more other PFs as backup PFs;
    on a link or port failure of the active PF, reconfiguring the bonding group to employ resources of a backup PF such that the resources of the backup PF are shared with the active PF; and
    performing data transfers using the shared resources of the active PF and the backup PF.

6. The method of claim 5, wherein the active PF includes an active port, further comprising:
    implementing Remote Direct Memory Access (RDMA) resources on the first PF including an RDMA queue pair (QP);
    prior to the link or port failure on the active PF, performing RDMA data transfers using the RDMA QP on the first PF and at least one of a transmit path and a receive path utilizing the active port;
    following the link or port failure of the active PF, performing RDMA data transfers using the RDMA QP on the first PF and at least one of a transmit path and a receive path utilizing a backup port, wherein the backup port is used as a new active port.

7. The method of claim 6, further comprising:
    prior to the link or port failure on the active PF, registering RDMA transmit (TX) queues in a first scheduler tree serving the first active link; and
    following the link or port failure of the active PF, moving the RDMA TX queues registered on the first schedule tree to a second scheduler tree serving the new active link.

8. The method of claim 1, further comprising:
    deleting a PF that is a member of a bonding group; and
    performing an un-share operations on the PF that is deleted so the resources that belong to the deleted PF cannot be accessed by other PFs.

9. The method of claim 1, wherein the compute platform includes a host operating system (OS) hosting a plurality of virtual machines (VMs), and the bonding group is implemented in a manner that is transparent to the plurality of VMs.

10. The method of claim 9, wherein the NIC is connected to an Ethernet switch via the second active link and a plurality of virtual functions (VFs) are implemented in the plurality of VMs, further comprising sending packets with Media Access Channel (MAC) addresses of the plurality of VFs over the second active link to the Ethernet switch.

11. A network interface controller (NIC) and associated software, comprising:
   first and second ports;
   a first physical function (PF) used for accessing the first port and including first transmit and receive resources employed by the first PF to perform data transfers via the first port;
   a second PF used for accessing the second port and including second transmit and receive resources employed by the second PF to perform data transfers via data transfers via the second port; and
   software, configured to be executed on a host processor in a compute platform in which the NIC is configured to be installed, the software including first and second link aggregation (LAG)-aware NIC drivers respectively associated with the first and second PFs and a bonding driver, wherein execution of the software on the host processor enables the compute platform:
   create a bonding group including the first and second PFs;
   implement the first PF as an active PF and use the first PF for data transfers while implementing the second PF as a backup PF;
   on a link or port failure of the active PF, reconfigure, by the bonding driver, the bonding group to employ at least a portion of the second transmit and receive resources of the backup PF such that those resources are shared with the active PF; and
   perform data transfers using the shared resources of the active PF and the backup PF.

12. The NIC and associated software of claim 11, wherein prior to creating the bonding group each of the first and second PF has a receiving path that includes a respective port and a respective Virtual Ethernet Bridge (VEB), and wherein when the first and second PFs are reconfigured the respective VEBs are merged into a single VEB.

13. The NIC and associated software of claim 11, wherein execution of the software further enables the compute platform to:
   configure a first receive path through the first FP comprising a primary receive path originating at the first port; and
   configure a second receive path through the second PF comprising a backup receive path originating at the second port;
   wherein the primary receive path is used to forward both control traffic and data traffic received at the first port and wherein the backup receive path is used to forward control traffic received at the second port while dropping packets associated with data traffic received at the second port.

14. The NIC and associated software of claim 13, wherein reconfiguration of the first and second PFs comprises:
   configuring a new primary receive path using receive resources in the second PF and the first FP and originating at the second port; and
   configuring a new backup receive path using receive resources in the second PF and the first FP and originating at the second port;
   wherein the new primary receive path is used to forward both control traffic and data traffic received at the second port.

15. The NIC and associated software of claim 11, wherein the active PF includes an active port and Remote Direct Memory Access (RDMA) resources including an RDMA queue pair (QP), wherein the backup PF includes a backup port, and wherein prior to the link or port failure on the active PF, the NIC is configured to perform RDMA data transfers using the RDMA QP on the first PF and at least one of a transmit path and a receive path utilizing the active port, and wherein following the link or port failure of the active PF, the NIC is configured to perform RDMA data transfers using the RDMA QP on the first PF and at least one of a transmit path and a receive path utilizing the backup port, wherein the backup port is used as a new active port.

16. The NIC and associated software of claim 15, wherein the first PF includes a first scheduler tree and the second PF includes a second scheduler tree, wherein the NIC is configure to register RDMA transmit (TX) queues in the first scheduler tree serving the first active link, and wherein following the link or port failure of the active PF, RDMA TX queues registered on the first schedule tree are moved to the second scheduler tree and used to serve the new active link.

17. A compute platform, comprising:
   a processor, having a plurality of cores and a Peripheral Component Interconnect Express (PCIe) interface;
   memory, communicatively coupled to the processor;
   a network interface controller (NIC) coupled to the PCIe interface including, first and second ports;
   a first physical function (PF) used for accessing the first port and including first transmit and receive resources employed by the first PF to perform data transfers via the first port; and
   a second PF used for accessing the second port and including second transmit and receive resources employed by the second PF to perform data transfers via data transfers via the second port; and
   a storage device, communicatively coupled to the processor; and
   a plurality of instructions stored in at least one of the storage device and memory and configured to be executed on at least a portion of the plurality of cores, the plurality of instructions comprising a first plurality of software components associated with a host operating system (OS) including first and second link aggregation (LAG)-aware NIC drivers respectively associated with the first and second PFs and a bonding driver, wherein execution of the instructions enables the compute platform:
   create a bonding group including the first and second PFs;
   implement the first PF as an active PF and use the first PF for data transfers while implementing the second PF as a backup PF;
   detect a link or port failure or receive notification from the NIC of a link or port failure, and in response,
   reconfigure, by the bonding driver, the bonding group to employ at least a portion of the second transmit and receive resources of the backup PF such that those resources are shared with the active PF; and
   perform data transfers using the shared resources of the active PF and the backup PF.

18. The compute platform of claim 17, wherein prior to creating the bonding group each of the first and second PF has a receiving path that includes a respective port and a respective Virtual Ethernet Bridge (VEB), and wherein when the first and second PFs are reconfigured the respective VEBs are merged into a single VEB.

19. The compute platform of claim 17, wherein execution of the instructions further enables the compute platform to:
- configure a first receive path through the first FP comprising a primary receive path originating at the first port; and
- configure a second receive path through the second PF comprising a backup receive path originating at the second port,
- wherein the primary receive path is used to forward both control traffic and data traffic received at the first port and wherein the backup receive path is used to forward control traffic received at the second port while dropping packets associated with data traffic received at the second port.

20. The compute platform of claim 19, wherein reconfiguration of the first and second PFs comprises:
- configuring a new primary receive path using receive resources in the second PF and the first FP and originating at the second port; and
- configuring a new backup receive path using receive resources in the second PF and the first FP and originating at the second port,
- wherein the new primary receive path is used to forward both control traffic and data traffic received at the second port.

21. The compute platform of claim 17, wherein the software components include a plurality of virtual machines (VMs) hosted by the host OS, and the bonding group is implemented in a manner that is transparent to the plurality of VMs.

\* \* \* \* \*

UNITED STATES PATENT AND TRADEMARK OFFICE
CERTIFICATE OF CORRECTION

PATENT NO. : 12,143,316 B2
APPLICATION NO. : 17/026651
DATED : November 12, 2024
INVENTOR(S) : Piotr Uminski et al.

It is certified that error appears in the above-identified patent and that said Letters Patent is hereby corrected as shown below:

In the Claims

Column 12, Lines 5-9, Claim 2 should read:
The method of claim 1, further comprising reconfiguring a receiving path of the NIC, wherein the reconfigured receiving path traverses shared resources associated with two or more PFs and is utilized by a second active link following link failure of the first active link.

Signed and Sealed this
Fourth Day of March, 2025

Coke Morgan Stewart
*Acting Director of the United States Patent and Trademark Office*